(12) United States Patent
Murdock et al.

(10) Patent No.: US 8,290,944 B2
(45) Date of Patent: Oct. 16, 2012

(54) METHOD FOR STORING BOOKMARKS FOR SEARCH RESULTS FROM PREVIOUSLY SUBMITTED SEARCH QUERIES BY A USER AND STORING LINKS TO SELECTED DOCUMENTS BY THE USER

(75) Inventors: Vanessa Murdock, Barcelona (ES); Luis Garcia, Sant Cugat del Vallès (ES); Barbara Poblete, Barcelona (ES); Vassilis Plachouras, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 597 days.

(21) Appl. No.: 12/323,297

(22) Filed: Nov. 25, 2008

(65) Prior Publication Data
US 2010/0131493 A1    May 27, 2010

(51) Int. Cl.
*G06F 7/00*    (2006.01)
*G06F 17/30*    (2006.01)
(52) U.S. Cl. .................. 707/726; 707/727; 715/206
(58) Field of Classification Search ................... None
See application file for complete search history.

(56) References Cited

U.S. PATENT DOCUMENTS 6,631,496 B1 * 10/2003 Li et al. .......................... 715/200
2006/0074870 A1 * 4/2006 Brill et al. ........................ 707/3
2006/0206460 A1 * 9/2006 Gadkari .......................... 707/3
2007/0239713 A1 * 10/2007 Leblang et al. .................. 707/6
2008/0168065 A1 * 7/2008 Kanevsky et al. .............. 707/10

OTHER PUBLICATIONS

Yahoo! Make Y! your home page, http://www.yahoo.com/ printed Nov. 24, 2008, 2 pgs.
Yahoo! Search Results, angelina jolie, http://search.yahoo.com/search?p=angelina+jolie&fr=yfp-t-201&toggle=1&cop=mss&ei... printed Nov. 24, 2008, 2 pgs.
Google Advanced Search, http://www.google.com/advanced_search?hl=en printed Nov. 24, 2008, 1 pg.
Internet bookmark—Wikipedia, the free encyclopedia, http://en.wikipedia.org/wiki/Bookmark_manager printed Nov. 24, 2008, 3 pgs.
Murdock et al., "Lightning Search Aggregate", Yahoo! Inc. Application filed on Nov. 25, 2008, 66 pgs.

* cited by examiner

*Primary Examiner* — Uyen T. Le
(74) *Attorney, Agent, or Firm* — Weaver Austin Villeneuve and Sampson LLP

(57) ABSTRACT

In one embodiment, a search query is received. Information identifying a bookmark representing the search query is automatically stored in association with a set of bookmarks. Search results corresponding to the search query are automatically obtained and provided, where the search results identify one or more documents. When one of the documents is selected, a link to the selected one of the documents is automatically stored in association with the bookmark.

22 Claims, 18 Drawing Sheets

METHOD FOR STORING BOOKMARKS FOR SEARCH RESULTS FROM PREVIOUSLY SUBMITTED SEARCH QUERIES BY A USER AND STORING LINKS TO SELECTED DOCUMENTS BY THE USER

BACKGROUND OF THE INVENTION

The present invention relates generally to computer implemented and automatically generated bookmarks.

Every day, millions of users search for information on the web via search engines. Through their interaction with search engines, not only are they able to locate the information they are looking for, but they also provide implicit feedback on the results shown in response to their queries by clicking or not clicking onto the search results.

Nowadays search engines can record query logs that keep various types of information about which documents (e.g., web pages or web sites) users click for which query. Such information can be seen as "soft" relevance feedback for the documents that are clicked as a result of specific queries. This "soft" relevance feedback may be used to generate a score associated with these documents that indicates the relevance of the documents to a particular query. This score may then be used by search engines to provide the most relevant documents in response to queries.

Unfortunately, users may not remember which search queries they have previously submitted. As a result, these users may repeatedly submit the same search queries in order to locate and retrieve documents that they have previously viewed. Accordingly, these repeated searches can yield an unsatisfying and frustrating user experience.

In view of the above, it would be beneficial if improved methods of searching could be implemented.

SUMMARY OF THE INVENTION

Methods and apparatus for automatically storing and generating bookmarks are disclosed. In one embodiment, a search query is received. Information identifying a bookmark representing the search query is automatically stored in association with a set of bookmarks. Search results corresponding to the search query are automatically obtained and provided, where the search results identify one or more documents. When one of the documents is selected, a hypertext link to the selected one of the documents is automatically stored in association with the bookmark.

In accordance with another embodiment, a set of one or more bookmarks is automatically generated (e.g., displayed), where each of the bookmarks represents a search query that has previously been executed. A set of one or more user clicks associated with at least one of the set of bookmarks may be automatically provided, wherein each of the set of one or more user clicks includes a hypertext link to a document that has been previously clicked in association with the corresponding search query that has previously been executed. The set of user clicks may be automatically provided in response to a user request. For example, the user request may be received when a cursor is placed over one of the bookmarks.

In accordance with yet another embodiment, a selection of one of a set of bookmarks is received, wherein each of the set of bookmarks identifies a search query that has previously been submitted. Search results corresponding to the selected bookmark are retrieved from memory. The search results that have been retrieved are then provided, wherein the search results include a link to each of one or more documents that have been previously clicked in association with the search query.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In the following description, a document may be defined as a Uniform Resource Locator (URL) that identifies a location at which the document can be located. The document may be located on a particular web site, as well as a specific web page on the web site. For instance, a first URL may identify a location of a web page at which a document is located, while a second URL may identify a location of a web site at which the document can be located.

In recent years, the Internet has been a main source of information for millions of users. These users rely on the Internet to search for information of interest to them. One conventional way for users to search for information is to initiate a search query through a search service's web page. Typically, a user can enter a query including one or more search term(s) into an input box on the search web page and then initiate a search based on such entered search term(s). In response to the query, a web search engine generally returns an ordered list of search result documents.

Figure 1:
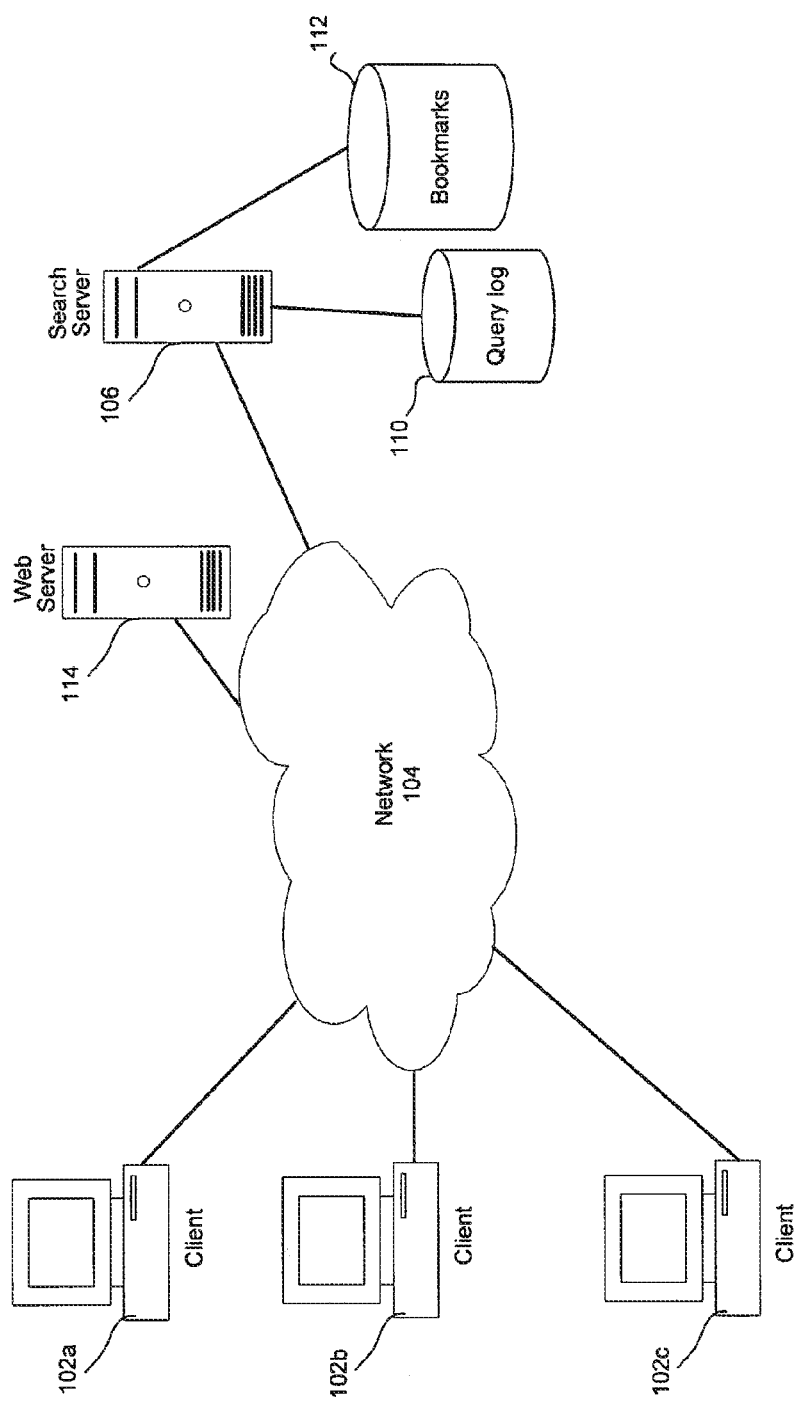
FIG. 1 is a block diagram illustrating an example system in which various embodiments may be implemented.

FIG. 1 illustrates an example network segment in which various embodiments of the invention may be implemented. As shown, a plurality of clients 102a, 102b, 102c may access a search application, for example, on search server 106 via network 104 and/or access a web service, for example, on web server 114. The network may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A search application generally allows a user (human or automated entity) to search for information that is accessible via network 104 and related to a search query including one or more search terms. The search terms may be entered by a user in any manner. For example, the search application may present a web page having any input feature to the client (e.g., on the client's device) so the client can enter a query including one or more search term(s). In a specific implementation, the search application presents an input box into which a user may type a query including any number of search terms. Embodiments of the present invention may be employed with respect to any search application. Example search applications include Yahoo! Search, Google, Altavista, Ask Jeeves, etc. The search application may be implemented on any number of servers although only a single search server 106 is illustrated for clarity.

The search server 106 (or servers) may have access to one or more query logs 110 into which search information is retained. For example, the query logs 110 may be retained in one or more memories that are coupled to the search server 106. Each time a user performs a search on one or more search terms, information regarding such search may be retained in the query logs 110. For instance, the user's search request may contain any number of parameters, such as user or browser identity and the search terms, which may be retained in the query logs 110. Additional information related to the search, such as a timestamp, may also be retained in the query logs 110 along with the search request parameters. When results are presented to the user based on the entered search terms, parameters from such search results may also be retained in the query logs 110. For example, the specific search results, such as the web sites, the order in which the search results are presented, whether each search result is a sponsored or algorithmic search result, the owner (e.g., web site) of each search result, whether each search result is selected (i.e., clicked on) by the user (if any), and/or a timestamp may also be retained in the query logs 110.

The implicit feedback provided by users when they click (or don't click) on various search results is typically recorded by a search engine in the form of a query log that includes a sequence of search actions, one per user query. Each search action may include one or more terms composing a query, one or more documents returned by the search engine, one or more documents that have been clicked, the rank of the document(s) that have been clicked, the rank of the documents in the list of search results, the date and/or time of the search action/click, an anonymous identifier for each search session, and/or a user identifier associated with the query, etc. It is important to note that the information in query logs is not typically provided to a client performing searches. In accordance with various embodiments, this information, or a portion thereof, may be processed and/or provided to the user in order to facilitate the search process and improve the user search experience, as will be described in further detail below.

In accordance with various embodiments, a Lightning Search feature may be implemented. The Lightning Search feature may provide two different related features in association with a particular client, user, or web browser. First, search queries that are submitted may be automatically stored as bookmarks without initiation by a user. Second, documents that are clicked in association with a particular search query may be identified in association with a corresponding bookmark. This may be accomplished by storing a hypertext link to each clicked document in association with the corresponding bookmark. The bookmarks and user clicks may be retained over multiple search sessions (e.g., until the Lightning Search feature is reset).

While information related to searches such as that described above may be stored in one or more query logs 110, information specific to the Lightning Search feature may also be stored separately as shown at 112 in one or more memories that are coupled to the search server 106. Such information may also be stored in a memory of one of the clients 102a, 102b, 102c that performed these searches. For instance, information related to bookmarks and user clicks may be stored as user data of a web browser. Thus, data generated via the disclosed embodiments may be stored in a memory associated with the search server 106 and/or a corresponding one of the clients 102a, 102b, 102c. This information may then later be automatically retrieved from the memory(s) associated with the search server 106 and/or client 102a and provided upon initiation of a search session or during a search session via that client. For example, bookmarks may be automatically generated and provided via a user interface when the client, web browser, or user identified by a specific user identifier returns to a web page via which the search engine may be accessed.

Embodiments disclosed herein may be implemented via the search server 106 and/or the clients 102a, 102b, 102c. For example, various features may be implemented via a web browser on the clients 102a, 102b, 102c. The disclosed embodiments may be implemented via software and/or hardware.

Figure 2:
FIG. 2 is a screen shot illustrating an example graphical user interface via which bookmarks may be implemented.

FIG. 2 is a screen shot illustrating an example graphical user interface via which bookmarks may be implemented. As shown in this example, a search portal 202 via which a user may submit search queries may be a web site such as http://search.yahoo.com/. The Lightning Search feature may be enabled 204 or disabled 206. The Lightning Search feature may also be reset 208. Resetting the Lightning Search feature may result in the deletion of any bookmarks and any associated user clicks that have been stored in association with a particular browser, client, user, or user account.

As shown in this example, a set of one or more bookmarks 210 may be automatically generated (e.g., provided or displayed) when a client, web browser, or user associated with the set of bookmarks returns to the search portal 202. In this example, the set of bookmarks is generated underneath the search text box 212. Each of the bookmarks represents a search query that has previously been submitted via the portal 202. Moreover, each of these bookmarks may include a hypertext link that enables an associated set of documents to be retrieved. In this example, the set of bookmarks 210 includes eighteen bookmarks, which include "Corvette ZR1," "angelina jolie," "barcelona," "business news," "dog training," "facebook," "flickr," "flights," "images," "london," "map route," "news," "photography," "programming perl," "recipes," "soccer," "travel," and "zimbabwe."

Each of the bookmarks in the set of bookmarks 210 may be associated with display characteristics. Thus, in order to automatically generate one of the bookmarks in the set of bookmarks 210, the display characteristics of the bookmark may be obtained. The bookmark may then be displayed in accordance with the display characteristics.

Information that is stored in association with a particular bookmark may be used to establish or modify the display characteristics of the bookmark. For instance, information such as the frequency with which a particular search query is executed (e.g., via selection of the bookmark) may be used to establish or modify the display characteristics of the corresponding bookmark. Thus, a bookmark associated with a more frequently executed search may be displayed more prominently, while a bookmark associated with a less frequently executed search may be displayed less prominently. The display characteristics of a bookmark may include properties such as the size of the font used to display the bookmark, color of the bookmark, whether the bookmark is bolded and/or underlined, etc. Accordingly, a hypertext link associated with a bookmark may be displayed in accordance with a frequency with which the bookmark is clicked (e.g., by the user, browser, or client device). This click frequency may be determined with respect to other bookmarks. In other words, it may be determined which bookmarks are clicked most frequently in order to emphasize the most frequently selected bookmarks.

A user may explicitly or implicitly submit a request to view information associated with a particular bookmark. This information may indicate those documents that have been clicked in association with a previously submitted search query identified by the bookmark, as well as other information associated with these documents. For example, the information may indicate a frequency with which each of the documents has been viewed (e.g., by the corresponding user, web browser, or client).

In accordance with one embodiment, when a cursor is placed over one of the set of bookmarks, a set of one or more user clicks associated with the bookmark may be automatically provided (e.g., displayed). Specifically, each of the user clicks may include a hypertext link to a document that has been previously clicked in association with the search query (e.g., identified by the bookmark) that has previously been executed.

Figure 3:
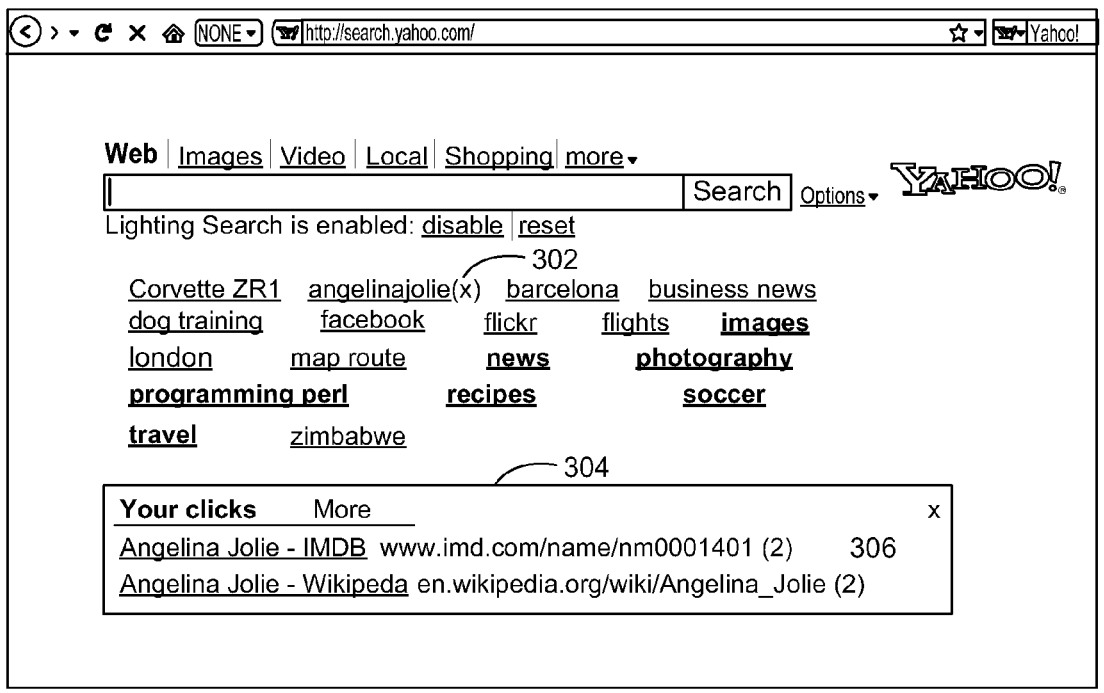
FIG. 3 is a screen shot illustrating an example graphical user interface via which prior search results that have been clicked may be accessed in association with one of the bookmarks shown in FIG. 2.

FIG. 3 is a screen shot illustrating an example graphical user interface via which prior search results that have been clicked may be accessed in association with one of the bookmarks shown in FIG. 2. As shown in this example, bookmark "angelina jolie" 302 indicates that the user previously submitted the "angelina jolie" search query. When a cursor is placed over the bookmark, "angelina jolie" 302, a set of user clicks associated with the bookmark is provided as shown at 304. In this example, the set of user clicks includes two different documents that are identified by corresponding hypertext links.

For each of the documents that were previously clicked, information associated with the document may be obtained and provided. For instance, this information may indicate a frequency with which the document has been selected (e.g., by the client, user, or web browser). As shown in this example at 306, the user has previously selected each of the documents identified under the heading "Your clicks" twice.

Figure 4:
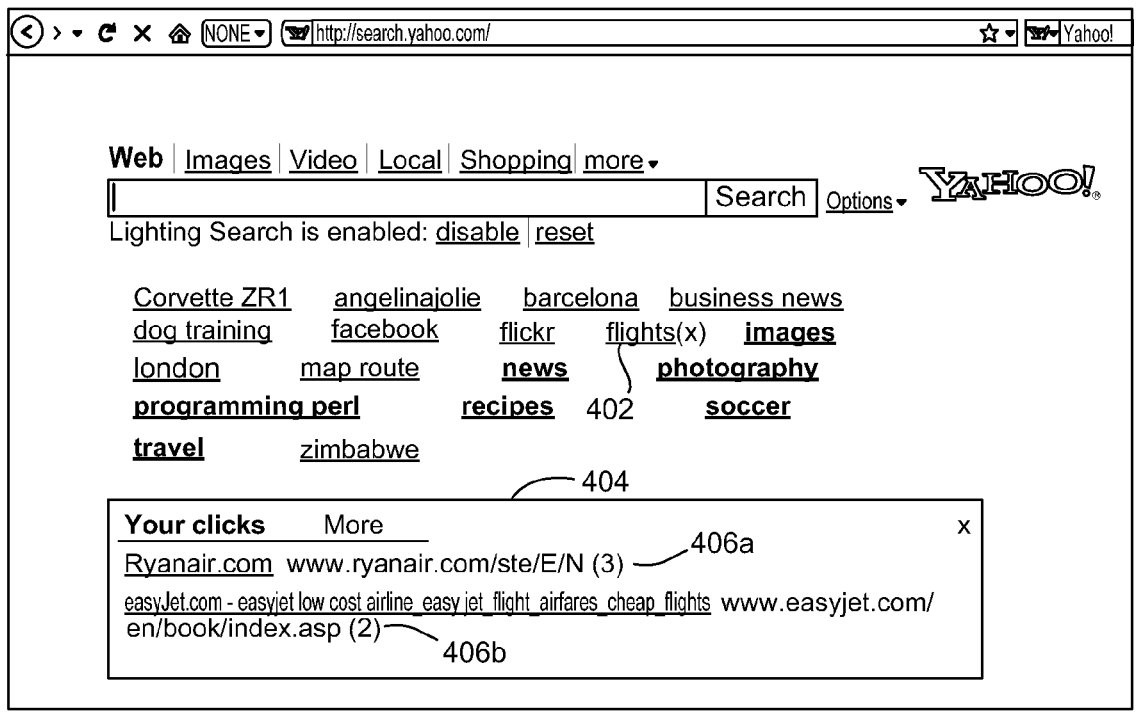
FIG. 4 is a screen shot illustrating example prior search results that have been clicked in association with another one of the bookmarks shown in FIG. 2.

FIG. 4 is a screen shot illustrating example prior search results that have been clicked in association with another one of the bookmarks shown in FIG. 2. As shown in this example, bookmark "flights" 402 indicates that the user previously submitted the "flights" query. When the cursor is placed over the bookmark, "flights" 402, a set of user clicks associated with the bookmark is provided as shown at 404. In this example, the set of user clicks includes two different documents that are identified by corresponding hypertext links.

As shown in this example, for each of the documents that was previously clicked, information indicating a frequency with which the document has been selected (e.g., by the client, user, or web browser) is provided. As shown in this example at 406a and 406b, the first document identified under the heading "Your clicks" has previously been selected by the user three times, while the second document identified under the heading "Your clicks" has previously been selected by the user twice.

Figure 5A:
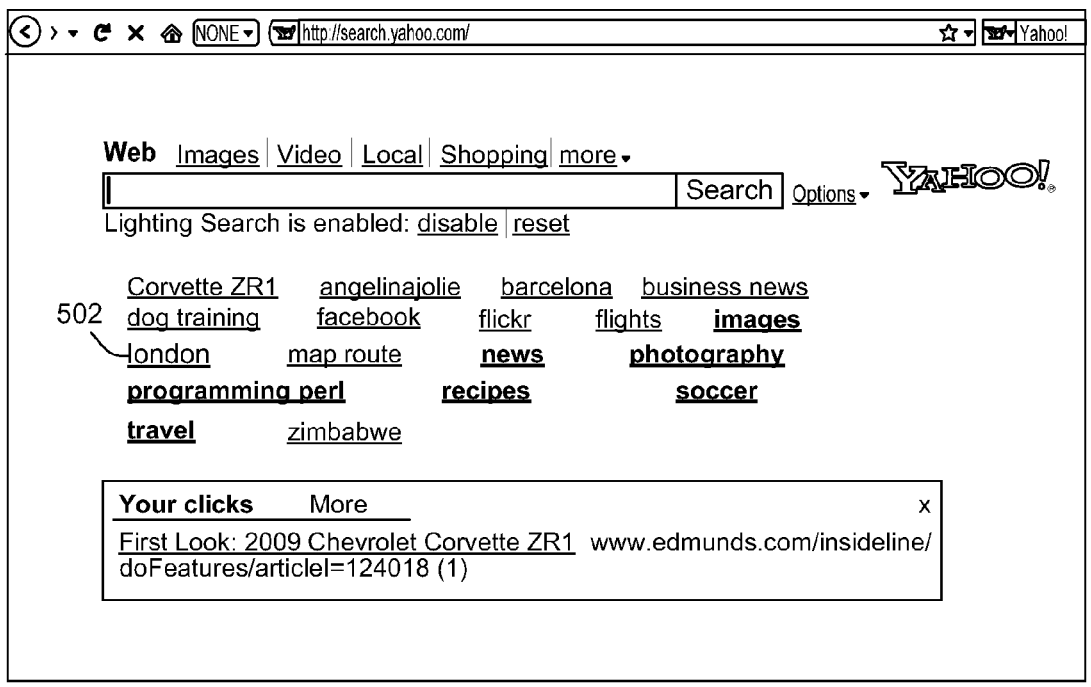
FIG. 5A is a screen shot illustrating an example graphical user interface via which a search associated with one of the bookmarks shown in FIG. 2 may be performed.

FIG. 5A is a screen shot illustrating an example graphical user interface via which a search associated with one of the bookmarks shown in FIG. 2 may be performed. Specifically, in this example, the user selects bookmark "london" 502 by clicking on the bookmark 502. Upon clicking on the bookmark 502, a search with the search term "london" represented by the bookmark 502, london, is performed. Accordingly, when one of the automatically generated bookmarks is selected, the search query represented by the selected bookmark is executed. The search engine may then obtain the search results corresponding to the search query and provide the search results corresponding to the search query.

Figure 5B:
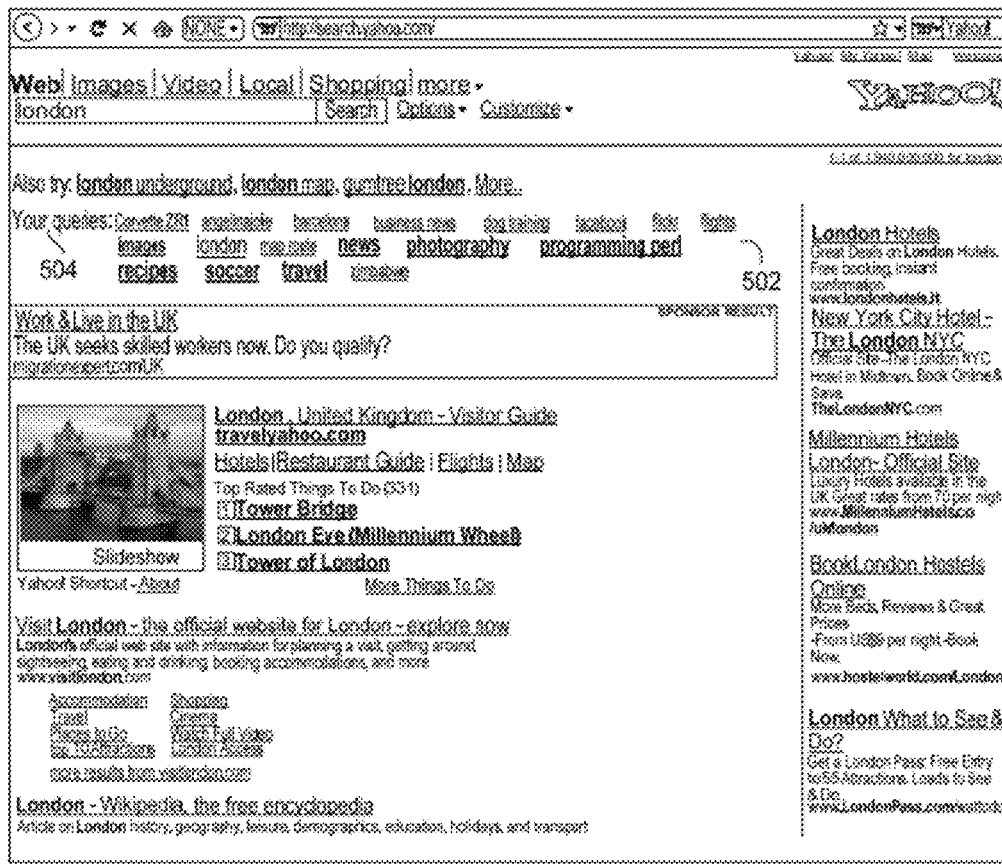
FIG. 5B is a screen shot illustrating an example graphical user interface via which results of the search executed in FIG. 5A may be provided.

FIG. 5B is a screen shot illustrating an example graphical user interface via which results of the search executed in FIG. 5A may be provided. As shown in FIG. 5B, the results for the search query are provided, where the search results identify one or more documents. Moreover, in this example, the set of bookmarks appear at 502 at the top of the web page next to "Your queries" title 504. Accordingly, the user interface facilitates the search process experienced by the user.

Figure 6A:
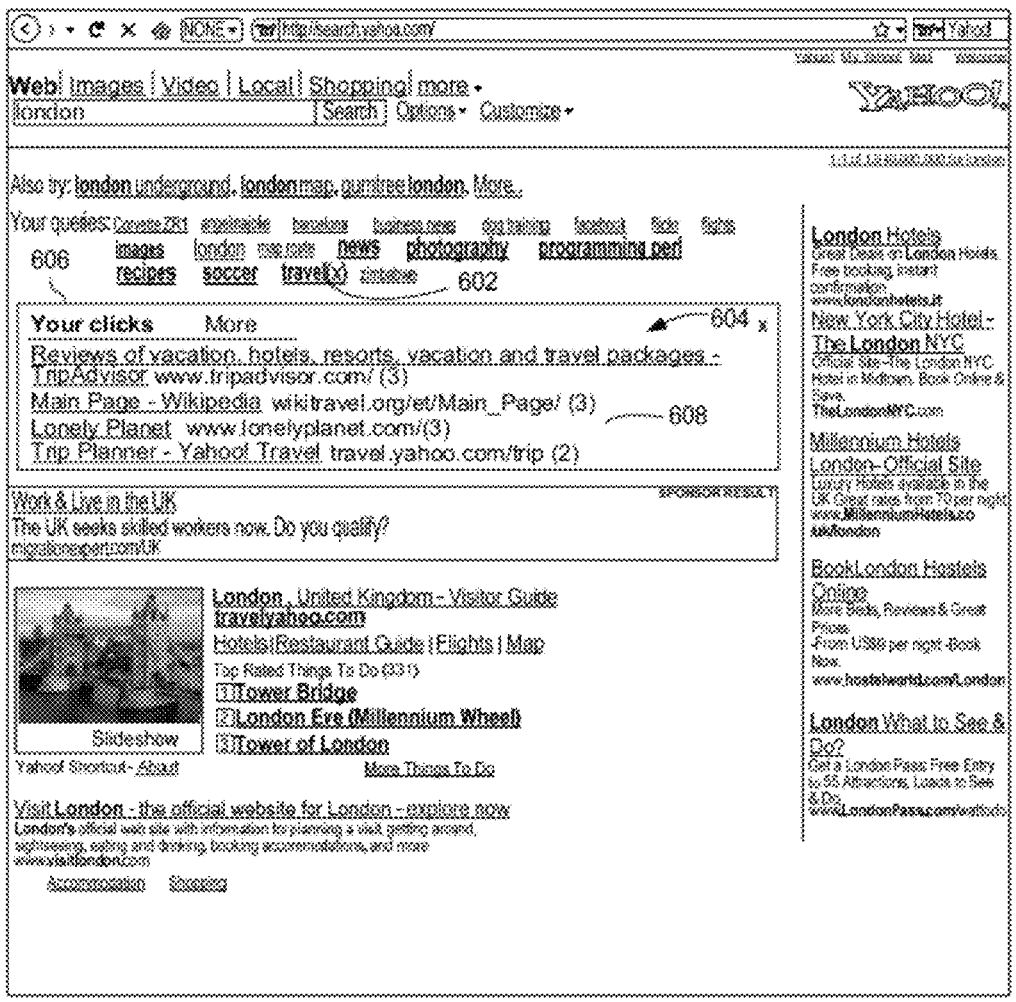
FIG. 6A is a screen shot illustrating an example graphical user interface via which prior search results that have been clicked may be accessed in association with one of the bookmarks shown in FIG. 5B.

FIG. 6A is a screen shot illustrating an example graphical user interface via which prior search results that have been clicked may be accessed in association with one of the bookmarks shown in FIG. 5B. When the user places the mouse over bookmark "travel" 602, previous search results that have been clicked by the user are presented in a portion of the user interface as shown at 604. Specifically, as shown in this example, the documents provided in previous search results that have been clicked by the user are shown under the title "Your clicks" 606. Each of the documents in this example has an indicator associated therewith at 608 that indicates the frequency with which these documents have been selected (e.g., viewed) by the user.

Figure 6B:
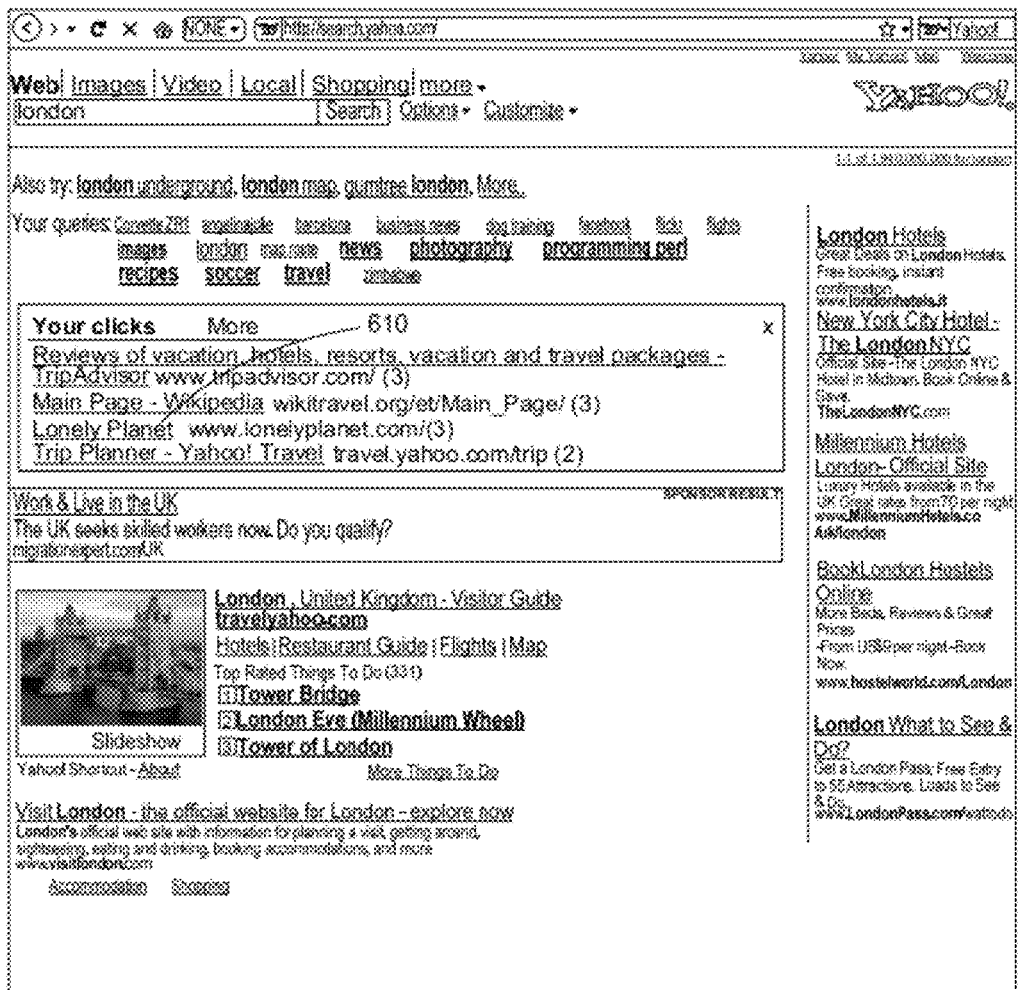
FIG. 6B is the screen shot of FIG. 6A after one of the prior search results associated with a bookmark has been selected.

FIG. 6B is the screen shot of FIG. 6A after one of the prior search results associated with a bookmark has been selected. When the user clicks on the "Lonely Planet" document as shown at 610, the user is redirected to the URL of the "Lonely Planet" website.

Figure 7A:
FIG. 7A is a screen shot illustrating an example graphical user interface illustrating an automatically generated set of bookmarks.

The user may then return to the search portal. FIG. 7A is a screen shot illustrating an example graphical user interface illustrating an automatically generated set of bookmarks as described above. As shown in this example, the set of bookmarks 210 does not include the bookmark "New York."

Figure 7B:
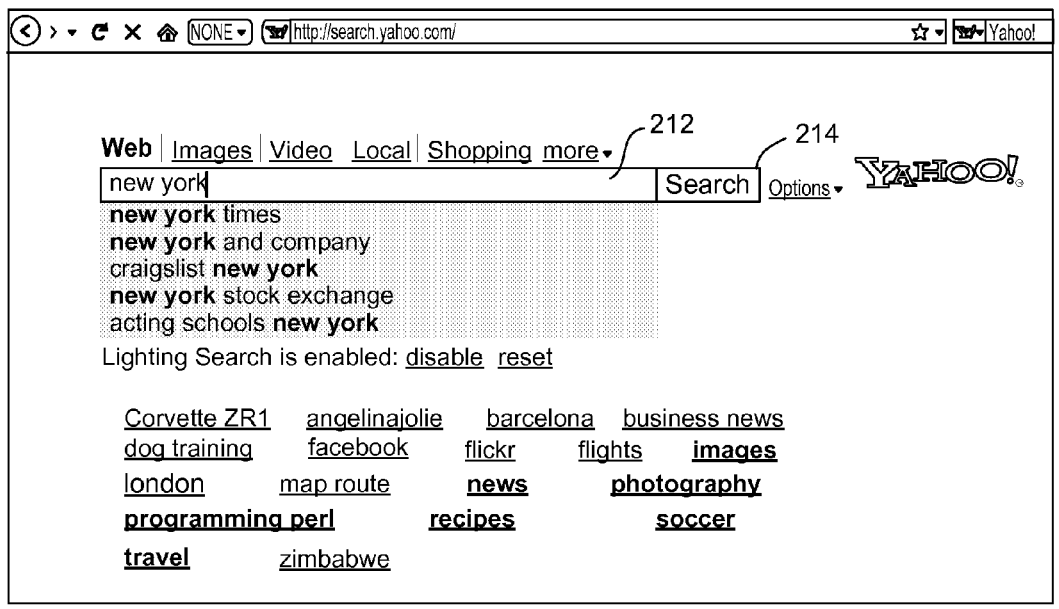
FIG. 7B is a screen shot illustrating an example search query that has been entered into a search text box.

FIG. 7B is a screen shot illustrating an example search query that has been entered into the search text box 212. In this example, the user types the search query "New York" and clicks on the "Search" button 214 to execute the search query.

Figure 8:
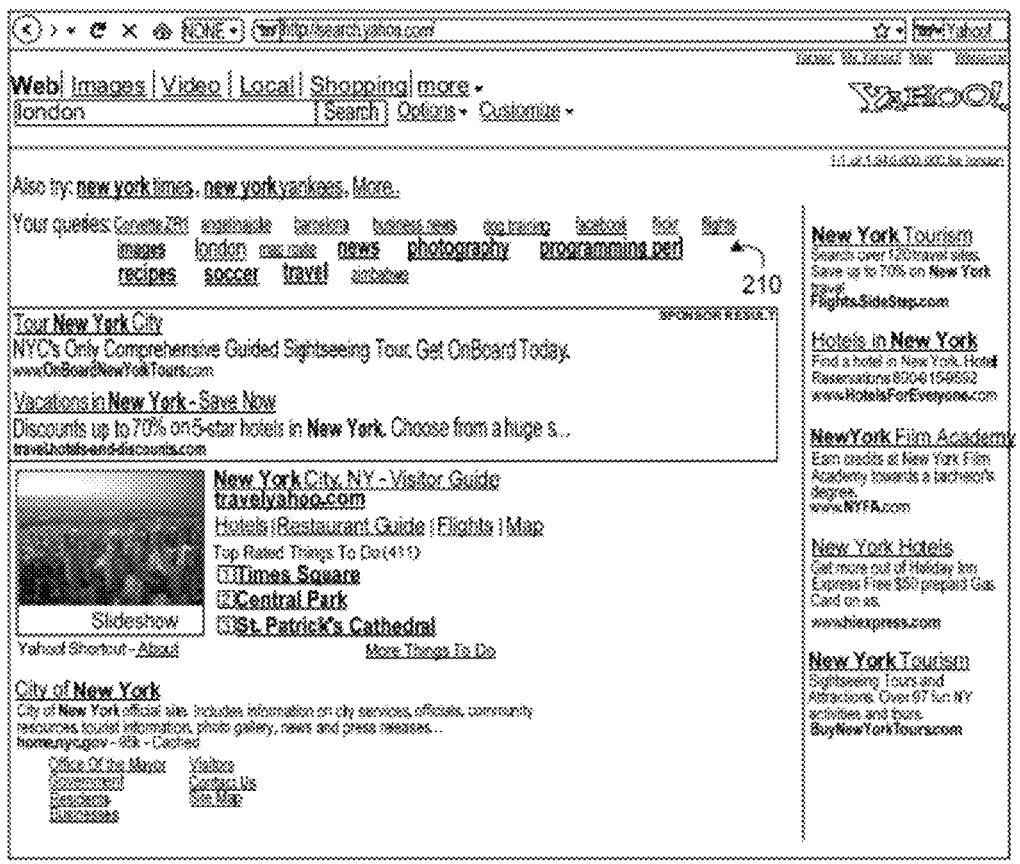
FIG. 8 is a screen shot illustrating an example graphical user interface illustrating the search results corresponding to the search query submitted as shown in FIG. 7B.

FIG. 8 is a screen shot illustrating an example graphical user interface illustrating the search results corresponding to the search query submitted as shown in FIG. 7B. Specifically, a search results page including the search results corresponding to the search query "New York" is presented. As shown in this example, the user interface includes the set of bookmarks 210. In accordance with one embodiment, a bookmark is automatically stored after one of the search results is clicked by the user. Alternatively, in accordance with another embodiment, a bookmark may be automatically stored merely based upon the search query that has been submitted.

Figure 9A:
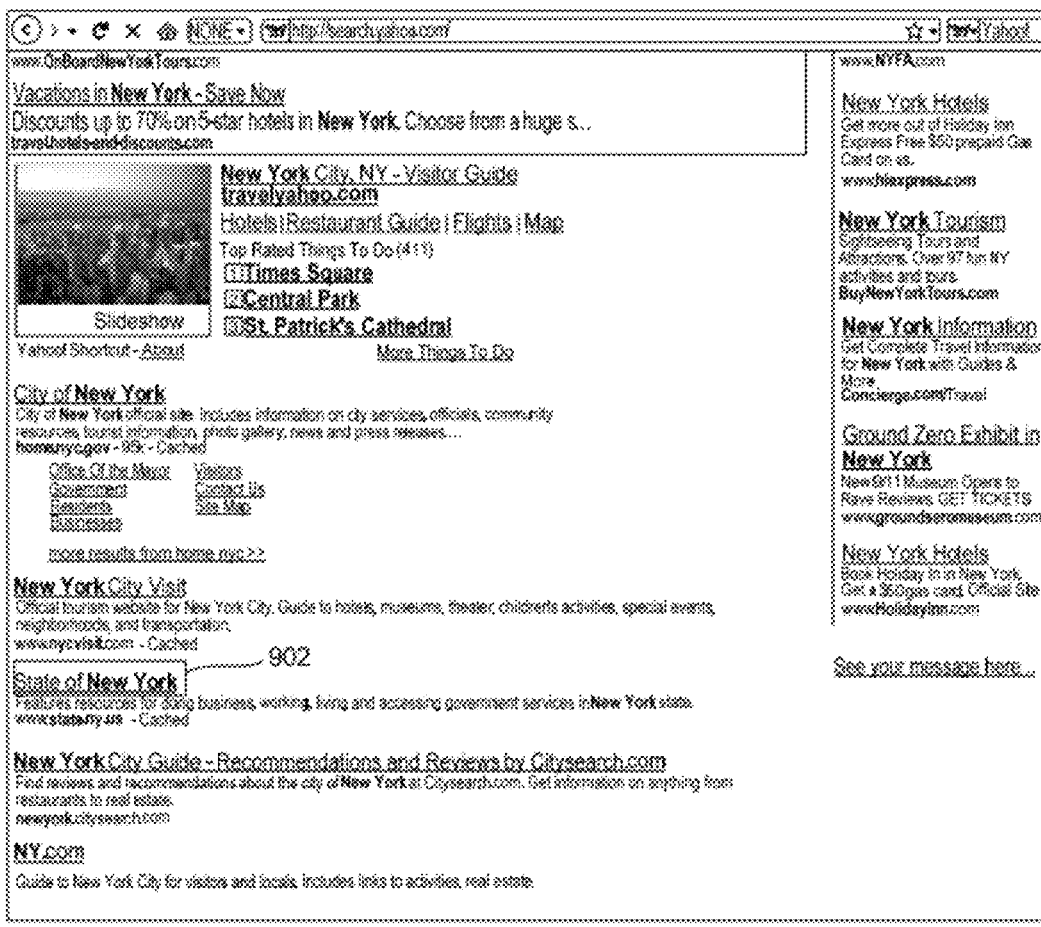
FIG. 9A is an example screen shot illustrating the selection of one of the search results provided in FIG. 8.

FIG. 9A is an example screen shot illustrating the selection of one of the search results provided in FIG. 8. The user clicks on one of the documents presented in the search results. Specifically, the user clicks on the "State of New York" search result as shown at 902. A bookmark identifying the search query previously submitted by the user may then be automatically stored and associated with the user, client, or web browser.

Figure 9B:
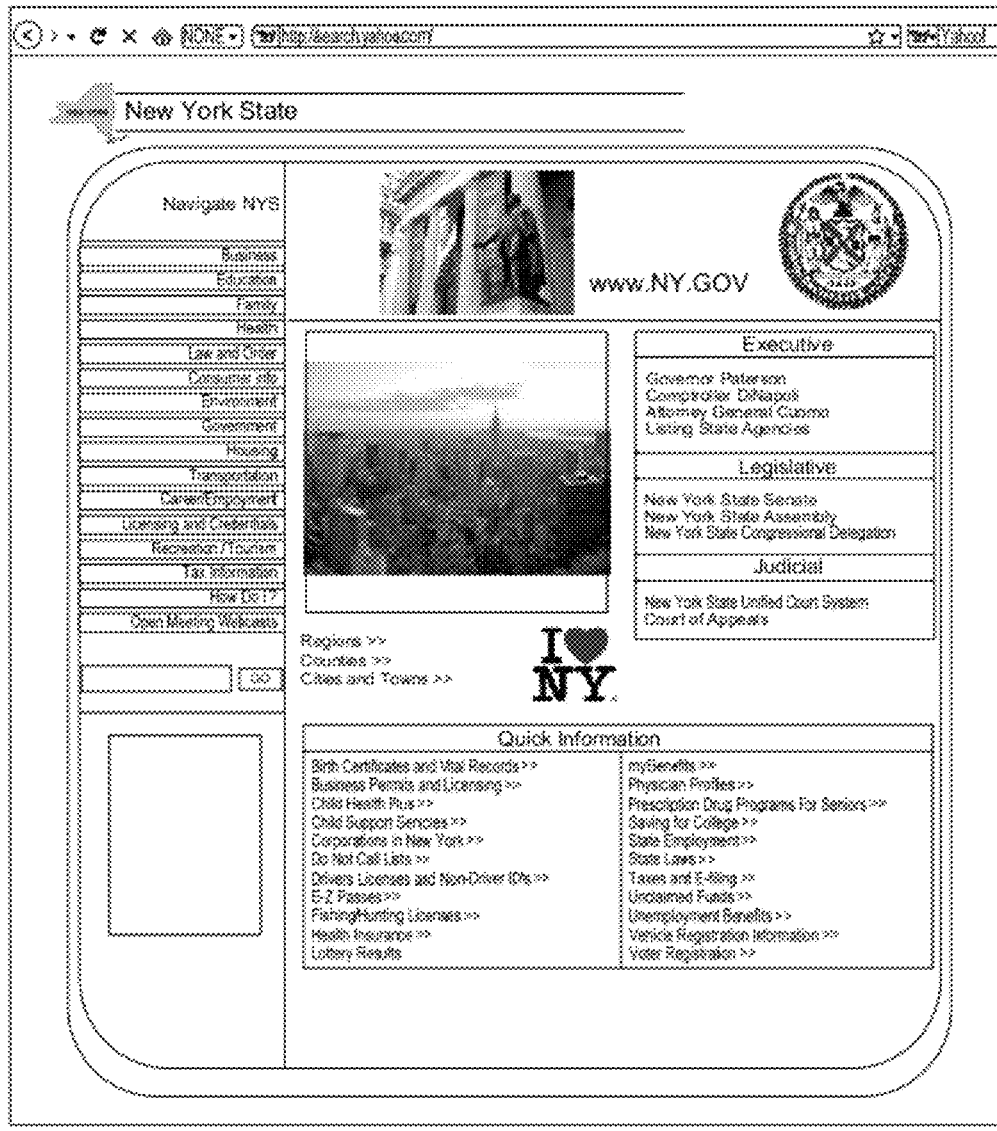
FIG. 9B is an example screen shot illustrating a resulting web page after the selection of the search result as shown in FIG. 9A.

FIG. 9B is an example screen shot illustrating a resulting web page after the selection of the search result as shown in FIG. 9A. As shown, the user is redirected to the web page "http://www.state.ny.us/." The user may return to the search portal, at which time the set of bookmarks may be automatically retrieved and provided in the user interface. Specifically, the search engine may automatically retrieve the set of bookmarks from a memory coupled to the search engine. Alternatively, the web browser may automatically retrieve the set of bookmarks from user data of the browser.

Figure 10A:
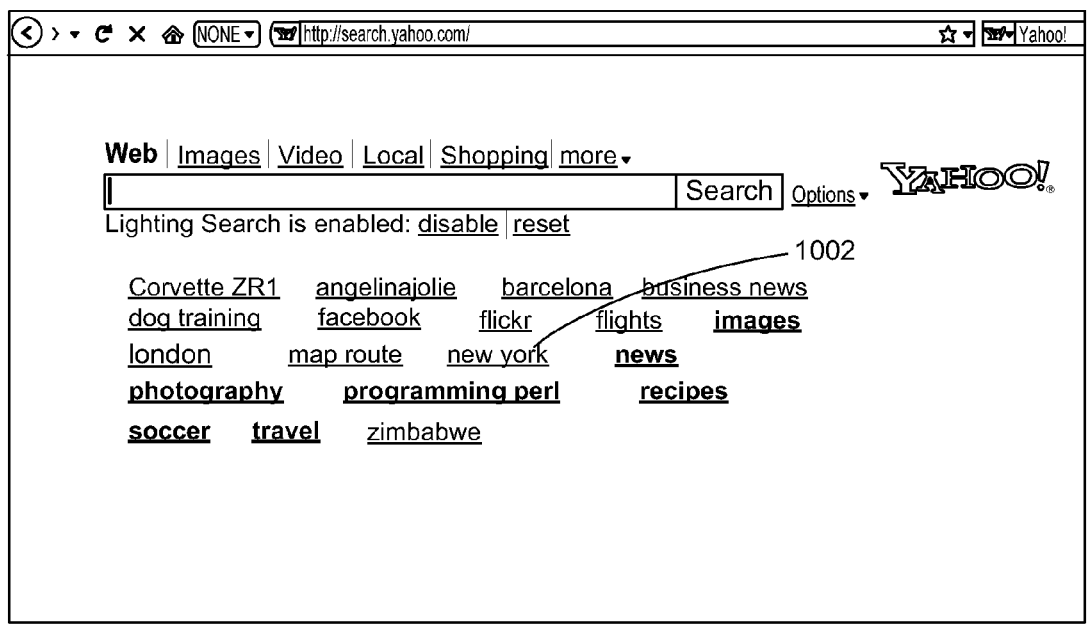
FIG. 10A is an example screen shot illustrating that the automatically generated set of bookmarks includes a new bookmark corresponding to the search query submitted in FIG. 7B.

FIG. 10A is an example screen shot illustrating that the automatically generated set of bookmarks includes a new bookmark corresponding to the search query submitted in FIG. 7B. Specifically, a bookmark "New York" 1002 corresponding to the search query previously submitted by the user now appears in the set of bookmarks 210 that are presented, since the user has clicked on one of the search results corresponding to the search query "New York."

At least one link to a set of one or more of the documents that have previously been selected in association with the search query may also be automatically provided (e.g., displayed). For instance, the user may then submit a request to view those search results associated with the bookmark that have previously been clicked by the user, client, or web browser. For instance, the user may indicate a selection of the automatically generated bookmark by submitting a request. In this example, such a request is submitted by simply moving the mouse over the bookmark.

Figure 10B:
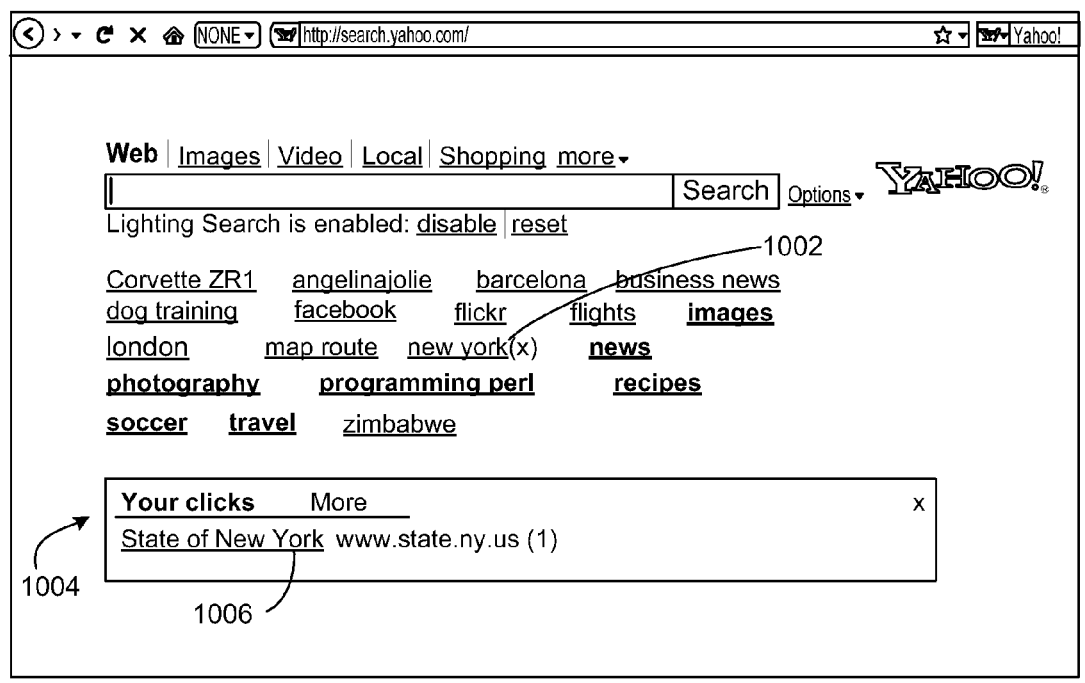
FIG. 10B is a screen shot illustrating example search results associated with the new bookmark shown in FIG. 10A that have previously been clicked.

FIG. 10B is a screen shot illustrating example search results associated with the new bookmark shown in FIG. 10A that have previously been clicked. In this example, the user moves the mouse over the bookmark "New York" 1002 in order to view the previously clicked search results 1004 associated with the bookmark. The previously clicked search results 1004 are identified in this example by the heading "Your clicks." As shown at 1006, the "State of New York" document appears in the previously clicked search results 1004. Specifically, a hypertext link associated with the document may be provided. If the user were to click on the document, the user would be redirected to the "State of New York" website.

Figure 10C:
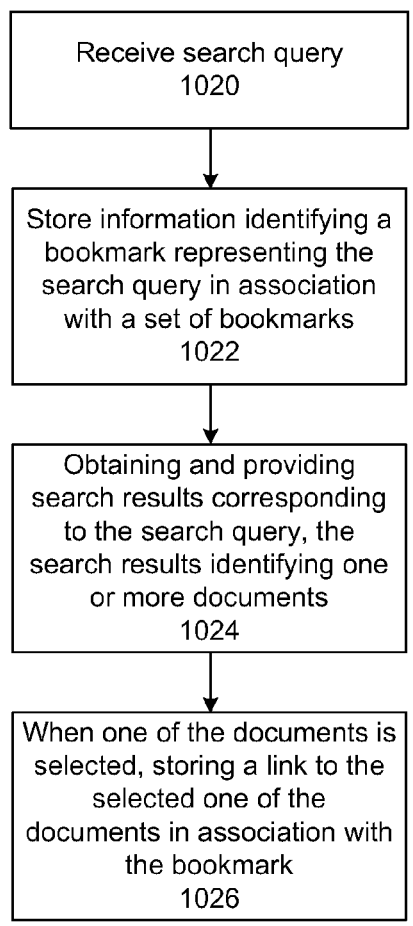
FIG. 10C is a process flow diagram illustrating an example method of automatically storing bookmarks in accordance with various embodiments.

FIG. 10C is a process flow diagram illustrating an example method of automatically storing bookmarks in accordance with various embodiments. Upon receiving a search query at 1020, information identifying a bookmark representing the search query may be automatically stored in association with a set of bookmarks at 1022. For instance, the information may be stored in a memory of a network device such as a search server or in user data of a browser. The set of bookmarks may be associated with a user, client, or web browser that has submitted the search query. Search results corresponding to the search query may be automatically obtained and provided at 1024, where the search results identify one or more documents. When one of the documents is selected, a link to the selected one of the documents may be automatically stored in association with the bookmark at 1026 such that a set of one or more previously clicked documents are associated with the bookmark. For instance, the link may be stored in a memory of a network device such as a search server or in user data of a browser. In accordance with one embodiment, the information identifying the bookmark is not stored until one of the documents produced by the corresponding search query has been selected.

Figure 11:
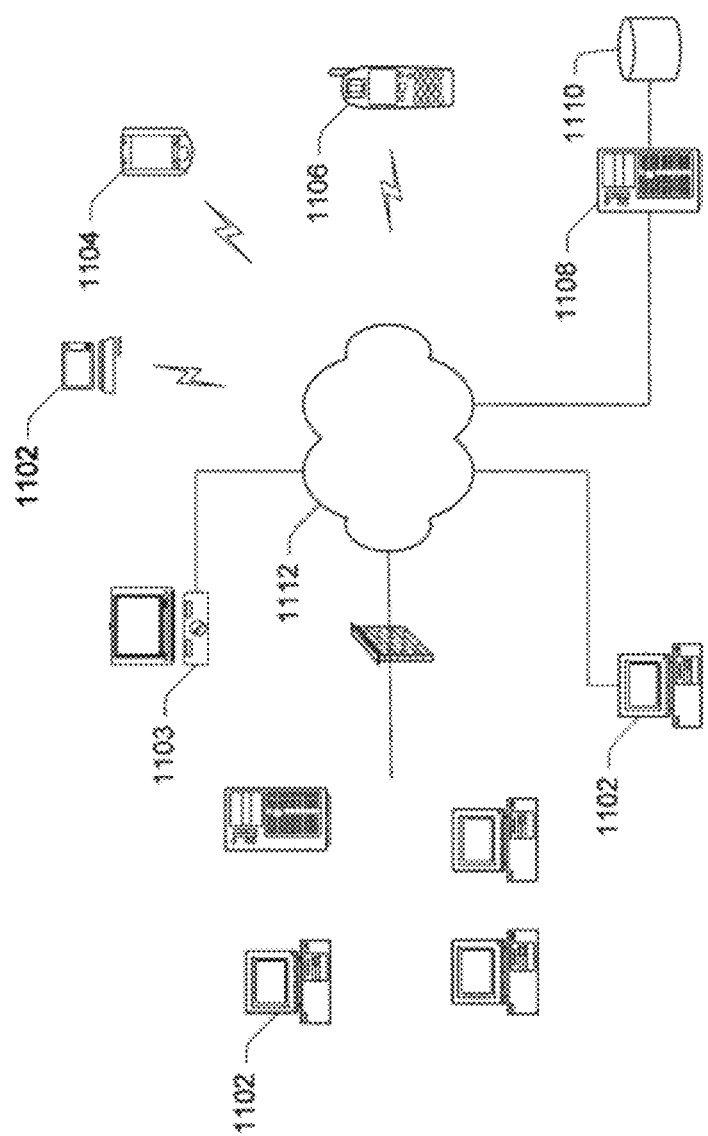
FIG. 11 is a simplified diagram of a network environment in which various embodiments may be implemented.

Embodiments of the present invention may be employed to automatically store, generate and provide bookmarks, as well as provide previously clicked documents in any of a wide variety of computing contexts. For example, as illustrated in FIG. 11, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a search query may be obtained from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

Once bookmarks have been generated, the bookmarks and/or associated documents may be processed according to the invention in some centralized manner. This is represented in FIG. 11 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store query logs, bookmarks (e.g., automatically generated bookmarks), hypertext links to previously clicked documents associated with the bookmarks, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 12:
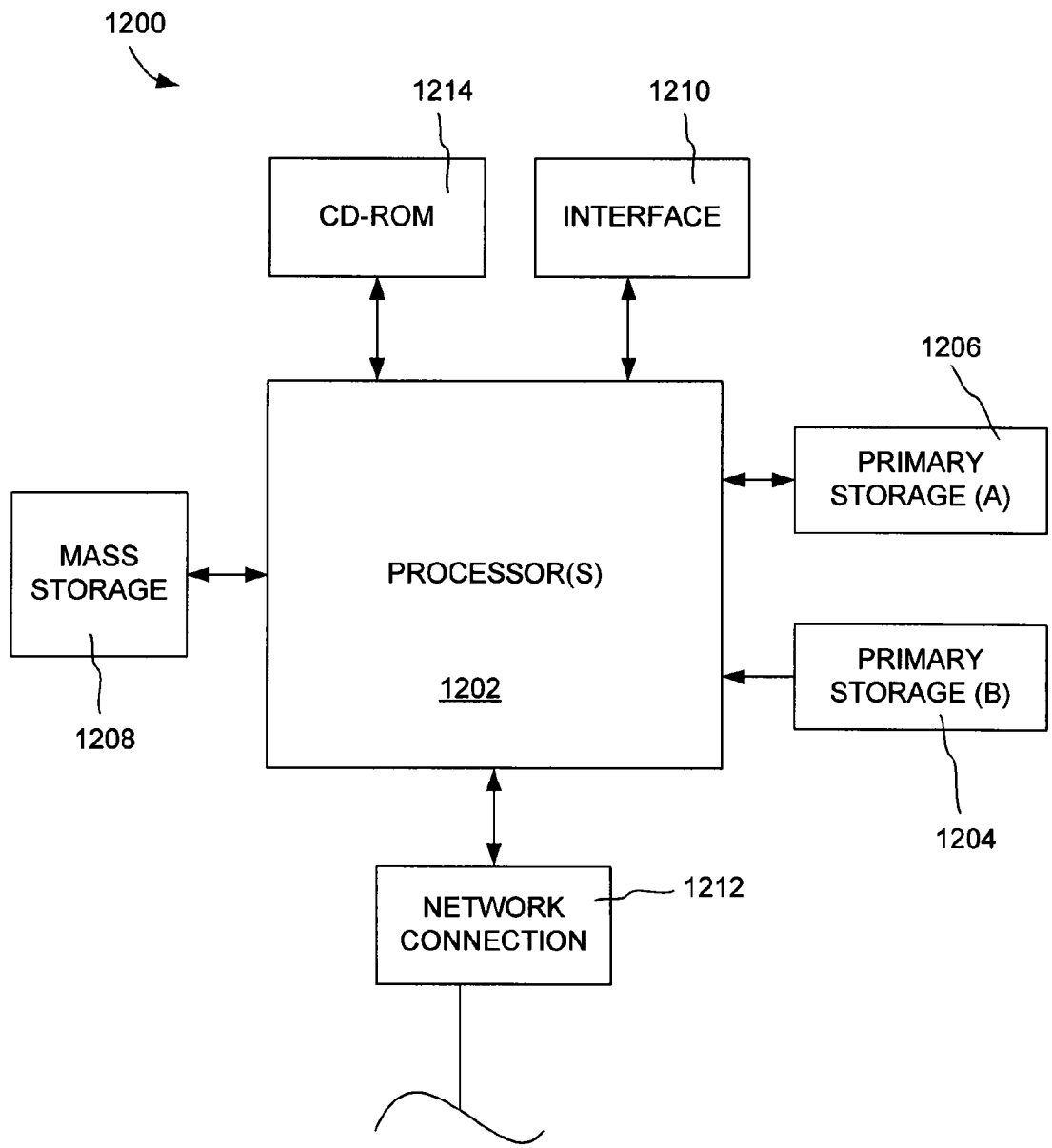
FIG. 12 illustrates an example computer system in which various embodiments may be implemented.

FIG. 12 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:

receiving a search query from a user;

automatically storing by a processor information identifying a bookmark representing the search query in association with a set of bookmarks, wherein each of the set of bookmarks represents a corresponding search query that has been executed by the user;

obtaining and providing search results corresponding to the search query, the search results identifying one or more documents;

when one of the documents is selected, automatically storing a link to the selected one of the documents in association with the bookmark; and presenting the set of bookmarks;

wherein when the bookmark is selected from the set of bookmarks, the search query represented by the bookmark is executed;

wherein the set of bookmarks is associated with the user that has issued the search query corresponding to each of the set of bookmarks.

2. The method as recited in claim 1, wherein automatically storing a link comprises:
storing the link in user data of a browser.

3. The method as recited in claim 1, wherein automatically storing information comprises:
storing the information in a memory of a network device.

4. The method as recited in claim 1, wherein automatically storing information comprises:
storing the information in user data of a browser.

5. The method as recited in claim 1, further comprising:
automatically generating the bookmark representing the search query.

6. The method as recited in claim 5, wherein automatically generating the bookmark comprises:
obtaining display characteristics of the bookmark; and
displaying the bookmark in accordance with the display characteristics.

7. The method as recited in claim 5, further comprising:
obtaining information associated with the one of the documents that was previously selected; and
providing the information associated with the one of the documents that was previously selected.

8. The method as recited in claim 7, wherein the information indicates a frequency with which the one of the documents has been selected.

9. The method as recited in claim 1, wherein automatically storing information identifying a bookmark representing the search query in association with a set of bookmarks is performed when the one of the documents is selected.

10. The method as recited in claim 1, wherein when another one of the documents is selected, storing a link to the another one of the documents in association with the bookmark such that a set of previously clicked documents is associated with the bookmark.

11. The method as recited in claim 1, further comprising:
automatically providing at least one link to a set of one or more of the documents that have previously been selected in association with the search query.

12. The method as recited in claim 11, wherein automatically providing at least one link comprises:
displaying the at least one link.

13. The method as recited in claim 11, wherein automatically providing at least one link is performed in response to user input.

14. The method as recited in claim 11, wherein automatically providing at least one link is performed in response to an indication of selection of the generated bookmark.

15. The method as recited in claim 1, wherein automatically storing a link comprises:
storing the link in a memory of a network device.

16. A non-transitory computer-readable medium storing thereon computer-readable instructions, comprising:

instructions for automatically retrieving by a processor a set of one or more bookmarks, each of the set of one or more bookmarks representing a search query that has previously been executed via a browser or user account;

instructions for automatically presenting the set of one or more bookmarks; and instructions for providing a set of one or more user clicks associated with at least one of the set of bookmarks, wherein each of the set of one or more user clicks includes a link to a document that has been previously clicked via the browser or user account in association with the corresponding search query that has previously been executed;

wherein the set of one or more bookmarks are associated with the browser or user account.

17. The non-transitory computer-readable medium as recited in claim 16, further comprising:
instructions for executing the search query represented by one of the bookmarks when the one of the set of bookmarks is selected, obtaining search results corresponding to the search query, and providing the search results corresponding to the search query, the search results identifying one or more documents.

18. The non-transitory computer-readable medium as recited in claim 16, further comprising:
instructions for automatically retrieving the set of one or more bookmarks from a memory.

19. The non-transitory computer-readable medium as recited in claim 16, further comprising:
instructions for automatically retrieving the set of one or more bookmarks from user data of the browser.

20. The non-transitory computer-readable medium as recited in claim 16, wherein automatically providing a set of one or more user clicks associated with the one of the set of bookmarks is performed in response to a user request.

21. The non-transitory computer-readable medium as recited in claim 20, wherein the user request is received when a cursor is placed over the one of the set of bookmarks.

22. A method, comprising:
providing a set of bookmarks, wherein each of the set of bookmarks identifies a corresponding search query that has previously been submitted;
receiving a selection of one of the set of bookmarks;
retrieving search results by a processor from memory in response to the selection of the one of the set of bookmarks, the search results corresponding to the selected bookmark; and
providing the search results that have been retrieved, wherein the search results include a link to each of one or more documents that have been previously clicked in association with the search query;
wherein the set of bookmarks are associated with a user that previously submitted the search query identified by each of the set of bookmarks or associated with a browser via which the search query identified by each of the set of bookmarks was previously submitted.

* * * * *